United States Patent [19]

Watts, Jr.

[11] 3,897,475

[45] July 29, 1975

[54] POLYHALOBENZONITRILE ALLYL ETHERS

[75] Inventor: Lewis William Watts, Jr., Auston, Tex.

[73] Assignee: Jefferson Chemical Company, Inc., Houston, Tex.

[22] Filed: Dec. 8, 1971

[21] Appl. No.: 206,162

[52] U.S. Cl. .......................... 260/465 F; 260/612 D
[51] Int. Cl. ............................................ C07c 121/74
[58] Field of Search .................................. 260/465 F

[56] References Cited
UNITED STATES PATENTS 2,912,453   11/1959   Moffett .............................. 260/465

*Primary Examiner*—Lewis Gotts
*Assistant Examiner*—Dolph H. Torrence
*Attorney, Agent, or Firm*—John R. Kirk, Jr.; H. G. Jackson; Terrence Dean Dreyer

[57]      ABSTRACT

New polyhalobenzonitrile allyl ethers are synthesized in good yield from polyhalobenzonitriles, allyl alcohol and a base. Polymers of these new compounds are useful as metal coatings.

6 Claims, No Drawings

POLYHALOBENZONITRILE ALLYL ETHERS

BACKGROUND OF THE INVENTION

1. Field of the Invention

The invention pertains to the field of new organic chemicals.

2. Description of the Prior Art

The classical synthetic scheme for the synthesis of substituted phenyl allyl ethers involves the interaction of suitably substituted phenols with allyl chloride, e.g.,

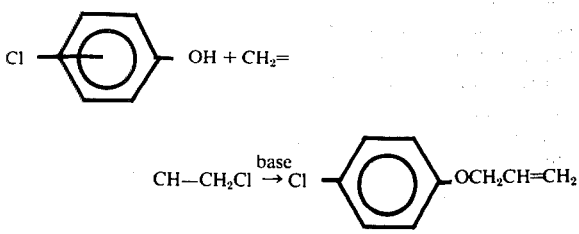

I have discovered that polyhalobenzonitrile allyl ethers can be synthesized in good yield from polyhalobenzonitrile, allyl alcohol and base. Even more surprisingly, I have demonstrated that this same procedure allows for the formation of polyhalobenzonitrile polyallyl ethers. These results were unexpected since earlier reports indicate polyhalophenols form when polyhaloaromatics are treated with alcohols in the presence of base.

SUMMARY OF THE INVENTION

New polyhalobenzonitrile allyl ethers of the formula

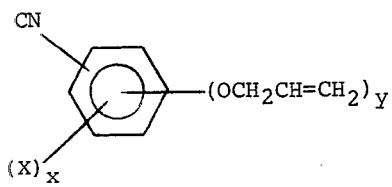

wherein X is halogen or halogen and hydrogen, $x$ is a number from 1 to 4, $y$ is a number from 1 to 4 are synthesized from polyhalobenzonitrile, allyl alcohol and a base.

DESCRIPTION OF THE PREFERRED EMBODIMENTS

I have discovered that polyhalobenzonitrile allyl ethers can be synthesized in good yield from polyhalobenzonitrile, allyl alcohol and a base. The reaction scheme of my invention is clearly superior to the classical methods for the preparation of polyhalobenzonitrile allyl ethers inasmuch as my procedure makes use of a more inexpensive, readily available reagent as the aromatic component, viz, the polyhalobenzonitrile instead of a polyhalophenol. The following examples illustrate my invention in more detail but are not to be construed as limitative.

EXAMPLE I

To a slurry of 3.3 gms. sodium hydride in 300 ml. of tetrahydrofuran (THF) is added dropwise 8.4 gms. allyl alcohol in ~50 ml. THF. Addition of 9.0 gms. pentachlorobenzonitrile caused a rapid increase in the temperature of the reaction mixture; cooling was necessary. After stirring for 30 minutes, the contents of the reaction flask were transferred to a large beaker, then treated with water. Filtration of the aqueous mixture gave a white crystalline solid, dichlorotriallyloxybenzonitrile which, when dry, weighed 10.0 gms. (90.2% yield). Crystallization from heptane-diethyl ether gave long colorless needles, m.p. 87°–89°C. Calculated for dichlorotriallyloxybenzonitrile ($C_{16}H_{15}Cl_2O_3N$, 340.20); 56.48%, C, 4.44% H, 4.12% N, 20.84% Cl. Found: 56.22% C, 4.15% H, 3.37% N, 21.71% Cl. Both the IR and NMR spectra are in agreement with the proposed formulation.

EXAMPLE II

A mixture of 400 ml. allyl alcohol and 20 gms. sodium hydroxide was heated over a period of one hour (55°C. maximum temperature) during which time approximately 50 ml. of liquid was removed under reduced pressure. When the resulting solution had been cooled to 20°C., 500 ml. pyridine and 137.6 gms. pentachlorobenzonitrile were added over a period of five minutes. After stirring for one hour at 30°C., the temperature was increased to 40°C. for 30 minutes then decreased to 30°C. for two hours. Addition of water followed by filtration gave 137 gms. of light tan solid which was subsequently shown to be allyloxytetrachlorobenzonitrile (92% yield). Calculated for $C_{10}H_5Cl_4NO$, 297.0; 40.44% C, 1.70%, H, 47.75% Cl, 4.72% N. Found: 40.94% C, 1.73% H, 47.0% Cl, 5.01% N. Additional support for the identity of this compound was derived from the NMR and IR spectra.

EXAMPLE III

Allyl alcohol (750 ml.) and sodium hydroxide (120 gms.) were heated at 60°C. for two hours. After adding one liter of pyridine the resulting mixture was warmed at 55°C. until 70 ml. of liquid had been collected. Pentachlorobenzonitrile (275.3 gms.) was then introduced into the reaction vessel at atmospheric pressure at a rate such that the maximum temperature did not exceed 40°C. After completing the addition, the crude reaction mixture was poured into water. Isolation of the product, which was a mixture of diallyloxytrichlorobenzonitrile and dichlorotriallyloxybenzonitrile, was achieved by filtration. When dry, the light tan solid weighed 245 gms.

EXAMPLE IV

A mixture of diallyloxytrichlorobenzonitrile and dichlorotriallyloxybenzonitrile was heated in the presence of t-butyl perbenzoate. A hard, moderately tough film formed which adhered well to a metal surface. Comparable results are obtained when other compounds of my invention are polymerized.

The temperature range for the process of my invention is −20°C. to 200°C., preferably from about 20°C. to about 150°C.

The mol ratio of polyhalobenzonitrile to base is within the range of about 1 to about 8, preferably 1 to 4.

Bases such as alkali metal hydroxides, alkali metal hydrides and alkali metal amides are useful in the process of my invention.

I claim:

1. Compounds of the formula

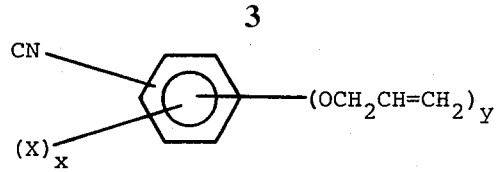

wherein X is halogen, $x$ is a number from 2 to 4, and $y$ is a number from 1 to 3, provided that $x + y$ is 5.

2. Dichlorotriallyloxybenzonitrile.
3. Allyloxytetrachlorobenzonitrile.
4. Diallyloxytrichlorobenzonitrile.
5. A process for preparing polyhalobenzonitrile allyl ethers of the formula

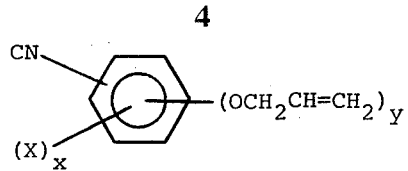

wherein X is halogen, and $x$ is a number from 2 to 4, and $y$ is a number from 1 to 3, provided that $x + y$ is 5, which comprises reacting a pentahalobenzonitrile with a molar excess of allyl alcohol at a temperature of from about 20°C. to about 150°C. in the presence of a base selected from the group of alkali metal hydroxides, alkali metal hydrides and alkali metal amides, present in an amount such that there is from about 1 to about 8 moles of pentahalobenzonitrile per mole of said base.

6. A process according to claim 5 wherein halogen is chlorine.

* * * * *